United States Patent [19]

Liebermann

[11] Patent Number: 5,404,935
[45] Date of Patent: Apr. 11, 1995

[54] CABINET-STYLE APPARATUS FOR TRANSFERRING HEAT TO FOOD AND COOLING FOOD

[75] Inventor: Benno E. Liebermann, Louisville, Ky.

[73] Assignee: Beltec International, Aurora, Ill.

[21] Appl. No.: 987,635

[22] Filed: Dec. 9, 1992

Related U.S. Application Data

[63] Continuation-in-part of Ser. No. 708,933, May 31, 1991, abandoned.

[51] Int. Cl.⁶ .................... F25B 29/00; A47J 39/00
[52] U.S. Cl. .................... 165/48.1; 165/64; 165/918; 165/919; 99/483; 99/470; 312/236; 219/387
[58] Field of Search ........... 165/48.1, 64, 918, 919; 99/483, 470; 312/236; 219/387

[56] References Cited

U.S. PATENT DOCUMENTS

| | | | |
|---|---|---|---|
| 2,690,002 | 9/1954 | Grenell | 62/523 |
| 3,030,486 | 4/1962 | Lashley . | |
| 3,205,033 | 9/1965 | Stentz . | |
| 3,507,322 | 4/1970 | Tetrick et al. | 165/137 |
| 3,836,220 | 9/1974 | Ishammar . | |
| 3,965,969 | 6/1976 | Williamson . | |
| 3,968,787 | 7/1976 | Basiulis . | |
| 3,982,584 | 9/1976 | Spanoudis . | |
| 4,103,736 | 8/1978 | Colato et al. . | |
| 4,210,675 | 7/1980 | Liebermann | 165/3 |
| 4,224,862 | 9/1980 | Liebermann . | |
| 4,235,282 | 11/1980 | de Filippis et al. . | |
| 4,278,697 | 7/1981 | Liebermann . | |
| 4,346,756 | 8/1982 | Dodd et al. . | |
| 4,517,446 | 5/1985 | Torning . | |

FOREIGN PATENT DOCUMENTS

| | | |
|---|---|---|
| 1414943 | 9/1965 | France . |
| 2420947 | 10/1979 | France . |
| 2553626 | 10/1983 | France . |
| 2611438 | 9/1988 | France . |
| 2843729 | 4/1979 | Germany . |
| 3843287 | 6/1990 | Germany . |
| 0268995 | 11/1987 | Japan . |
| 0354745 | 6/1961 | Switzerland . |
| 0826625 | 1/1960 | United Kingdom .......... 165/170 |
| 2023795 | 1/1980 | United Kingdom . |
| WO91/12473 | 8/1991 | WIPO . |
| WO92/21272 | 12/1992 | WIPO . |

OTHER PUBLICATIONS 8 photographs, UK Temperfect units (no date).
Documentation of Food Temperature and Product Quality in The Thermodyne Cabinet, by Cornell University School of Hotel Administration, Mar., 1978.
Condensed Cornell University School of Hotel Administration Documentation of Food Temperature and Product Quality in the Lockwood Thermodyne Hot Store Cabinet, Mar., 1978.

*Primary Examiner*—John K. Ford
*Attorney, Agent, or Firm*—Wallenstein & Wagner, Ltd.

[57] ABSTRACT

The present invention is directed to a vertical cabinet having the dual function of heating or cooling food articles within the cabinet. The cabinet comprises a plurality of removable, vertically spaced-apart support shelves of a conductive material for supporting food articles. One aspect of the invention provides for heating and cooking of food articles by circulating a thermal liquid fluid through a heating channel having a serpentine configuration in each shelf. Each shelf has quick-disconnect couplings. Another aspect of the invention provides for cooling and refrigeration of food articles by circulating a chilled fluid transfer media from a cooling unit connected to the vertical cabinet to the shelves of the cabinet.

4 Claims, 10 Drawing Sheets

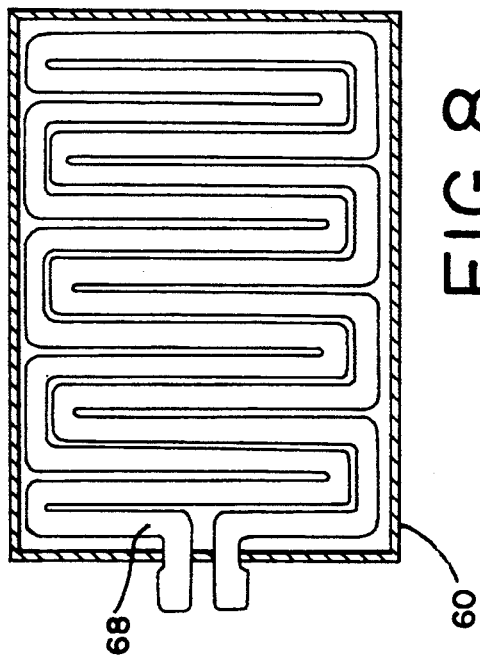
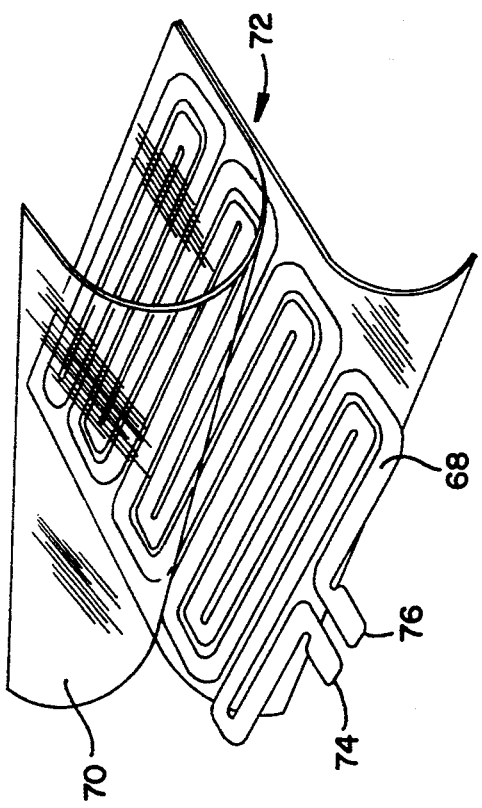
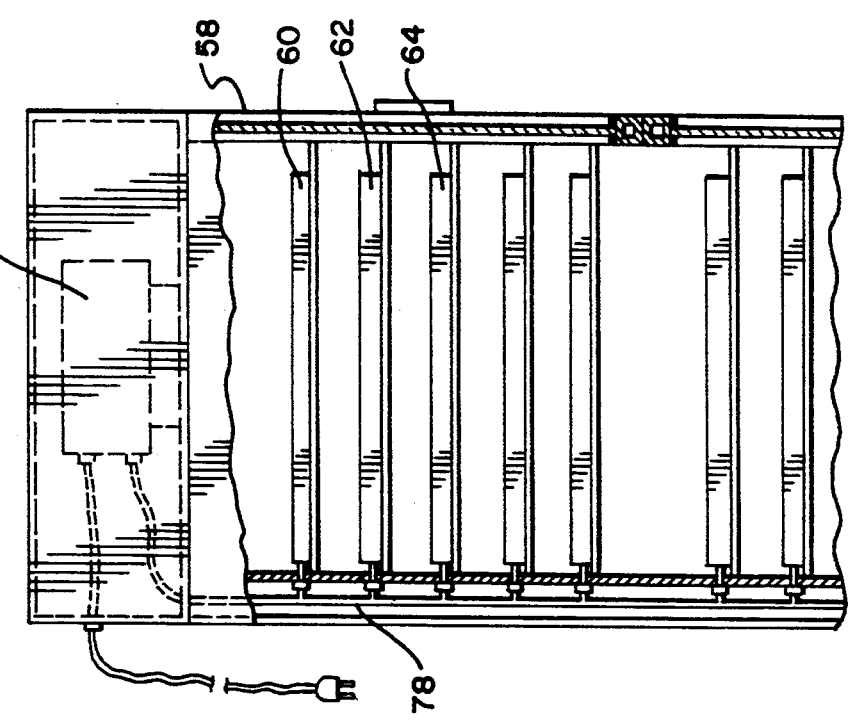

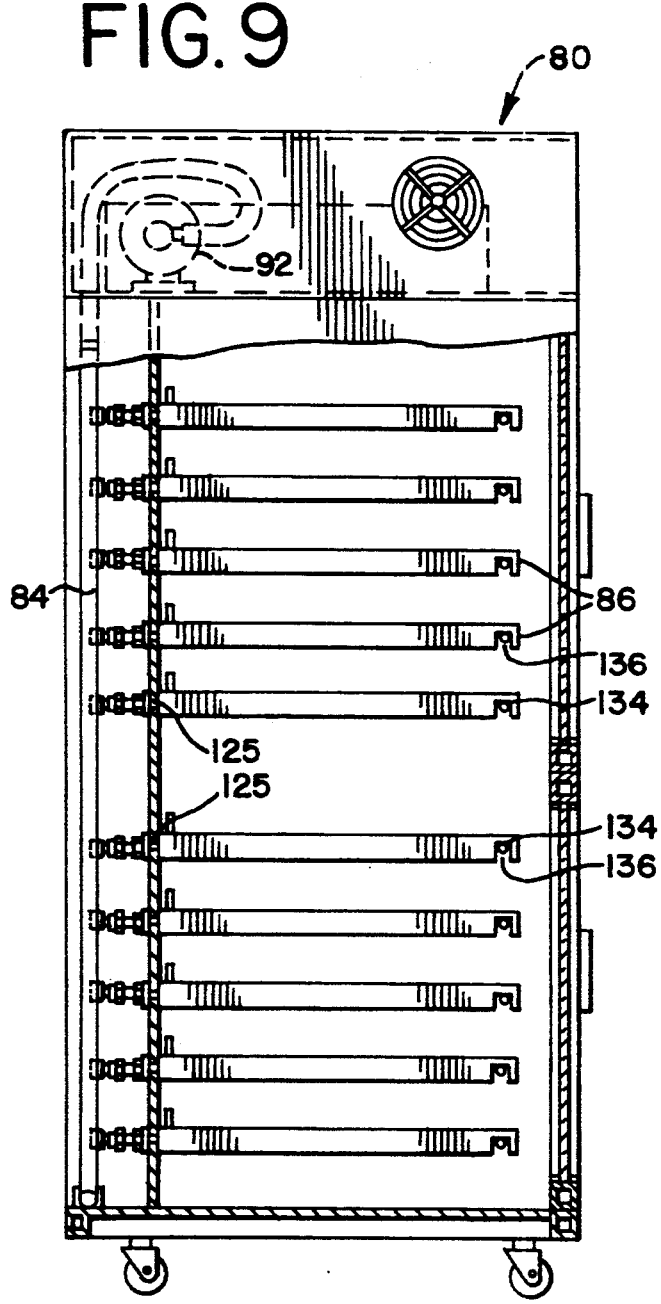
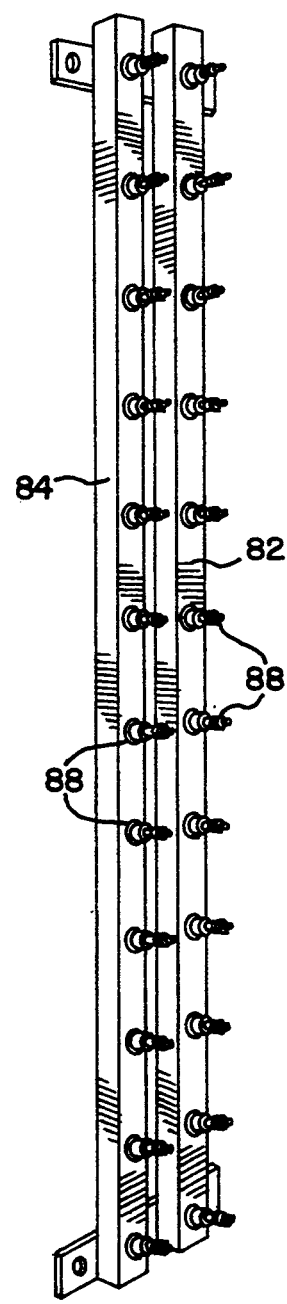
FIG. 9
FIG. 10

Comparative Cooling Time - Temperature Relation between
Temperfect 'Conduction' Cooling and Conventional 'Convection'
Cooling i.e. Refrigeration

CABINET-STYLE APPARATUS FOR TRANSFERRING HEAT TO FOOD AND COOLING FOOD

RELATED APPLICATION

This application is a continuation-in-part of U.S. application Ser. No. 07/708,933, filed on May 31, 1991, now abandoned.

TECHNICAL FIELD

The present invention relates generally to an apparatus having the dual function of heating or cooling food. One aspect of the invention relates generally to ovens for cooking and heating foods, and also for maintaining food cooked by such ovens at constant temperatures. More particularly, this aspect of the invention relates to an oven for providing a combination of convection and conduction cooking and heating through an individually thermalized shelf. The combined convection/conduction heating is provided by passing thermal energy through a heating channel having a serpentine configuration.

Another aspect of the invention relates to an apparatus having the function of conduction refrigeration which converts a temperature transfer fluid to a cooling media cycle. In order for the cabinet-style apparatus of the present invention to be suitable for heating or cooling of food, a refrigeration/cooling assembly means is used with the apparatus. The cooling assembly means comprises a heating/cooling selector attachment unit attached directly to the back manifold of the apparatus and a refrigeration/cooling unit connected to the attachment unit. Thus, conduction cooling rather than conventional convection cooling is achieved.

BACKGROUND OF THE INVENTION

Ovens for cooking and heating foods are well known in the art. Some of these ovens facilitate convective cooking in which heat is indirectly transferred to the food through the air between the heat source and that food. Other ovens facilitate conductive cooking where the food is heated by direct contact with a surface at an elevated temperature.

A few ovens provide combinations of convective and conductive cooking. U.S. Pat. No. 4,224,862 discloses a shelf and serpentine, widely spaced-apart hollow tubing within that shelf for the transport of heating fluids.

Trays or shelves for a hot food cabinet are disclosed in FIGS. 4 and 5 of U.S. Pat. No. 3,030,486. This patent further discloses electric heating elements and steam as a heating medium.

A prior experimental apparatus developed by the inventor of the present invention features a vertical cabinet having a plurality of individually thermalized, vertically spaced-apart rectangular support shelves. These shelves are made from a heat conductive material. Specifically, the shelves are made from two aluminum sheets of differing thickness. The thicker sheet, having a thickness of about 40/1000th inch, defines a top surface of the shelf. The thinner sheet, having a thickness of about 30/1000th inch, defines a bottom surface. The two shelves are roll-bonded together in a manner that forms by expansion a serpentine fluid channel in the bottom surface. A heated fluid may be passed through the channel by a fluid inlet and outlet positioned along one width side of the shelf. As a result of such inlet positioning, the serpentine channel undulates in a manner parallel to the shelf width.

While the foregoing prior art device was an improvement over prior art heating and holding cabinets, it was determined that the top surface sheet was insufficiently thick. This caused the top surface to become uneven and indented during the roll-bonding process. As a result, the top surface had high and low spots which prevented even and uniform conductive thermalization of a food product placed thereon. In addition, the undulation of the serpentine channel in a manner generally parallel to the width of the shelf did not efficiently and uniformly thermalize the complete surface area of the top surface of the shelf. Unthermalized zones on the top surface thereby resulted.

In addition, refrigeration technology is known in the art. A prior art device that provides for both heating and refrigeration features is disclosed in U.S. Pat. No. 4,235,282 to de Filippis et al. This patent discloses a tray cabinet comprising a refrigerating device to pump refrigerated air into a set of shelves for receiving removable trays and a means for individually heating restricted sections in the trays. However, the tray cabinet of this patent is cooled by convection refrigeration rather than the more efficient conduction refrigeration of the present invention.

Another prior art device that provides for both heating and refrigeration features is disclosed in U.S. Pat. No. 4,346,756 to Dodd et al. This patent discloses an apparatus for selectively heating an individual food item in a refrigerated environment. Again, however, the apparatus of this patent is cooled by convection refrigeration rather than the conduction refrigeration of the present invention.

Other prior art devices that include heating and cooling features are disclosed in U.S. Pat. Nos. 3,205,033 to Stentz; 3,965,969 to Williamson; 3,982,584 to Spanoudis; and 4,103,736 to Colato et al. These prior art devices suffer some of the same deficiencies as de Filippis et al. and Dodd et al.

The above problems of prior art heating and holding cabinets and heating and cooling cabinets are addressed by the development of the present invention. The present invention is an improvement over the prior art and overcomes the problems associated with the prior art. The apparatus of the present invention provides consistent and superior heating and cooling transfer efficiencies because the apparatus utilizes principles of conduction heat/coolant transfer as opposed to using only the conventional convection heating/cooling technologies in common practice today.

SUMMARY OF THE INVENTION

Generally, the present invention comprises a vertical cabinet for transferring heat to food articles within that cabinet, or in the alternative, cooling food articles within that cabinet. The cabinet includes a plurality of vertically spaced-apart, individually support shelves which can be thermalized or cooled, which are made from a heat or cold conductive material, and which support food articles. Integrally constructed within each shelf is a channel having a serpentine configuration for heating and cooling.

In the cabinet is activated for heating, an energy circulation media element or fluid transfer media is carried at an upper portion of the cabinet for passing thermal energy through the serpentine channel. Inlet and outlet connectors on each shelf facilitate passage of thermal energy into and out of the serpentine channel. Supply conduits are provided within the cabinet for transferring the thermal energy from the energy circulation element to the thermalizing channel. Return conduits within the cabinet facilitate return of the thermal energy to the energy circulation element. Thus, it is among the primary aspects of the present invention to provide an apparatus that uses conduction heating by passing thermal energy through a heating channel having a serpentine configuration.

It is another aspect of the present invention to provide an apparatus that uses conduction cooling which is achieved by using a refrigeration/cooling assembly means with the cabinet-style apparatus of the present invention. The cooling assembly means comprises a heating/cooling selector attachment unit attached to the back manifold of the cabinet-style apparatus and a refrigeration/cooling unit connected directly to the attachment unit via an input pipe and an output pipe. The embodiment comprising a separate external attachment unit connected to the back of the cabinet and the separate remote cooling unit are used so that the functioning of the components and connections at the top of the cabinet-style apparatus are not substantially disrupted. The attachment unit comprises a plurality of valves and pipes that divert the stream of flow of a fluid transfer media either from its cooled state from the cooling unit into the apparatus or from its heated state from the heating unit/reservoir into the apparatus. The cooling unit output pipe transfers the fluid transfer media from the remote cooling unit, passes the fluid through the attachment unit, and introduces the fluid into the plates or shelves of the cabinet apparatus in order to bring about a preferred temperature equilibration. The cooling unit input pipe transfers the fluid transfer media back into the cooling unit after it has circulated through the shelves and apparatus so that it can be re-cooled in the cooling unit. The refrigeration/cooling unit itself comprises a heat exchanger, compressor, condenser, circulating pump and motor, inline filter, and a pressure sensing unit. A heating/cooling selector switch is located on the back of the cabinet so that a user can manually activate either the heating or cooling mechanisms. When the cooling mechanism is activated, a control box housed in the cooling unit is also activated to start the components of the cooling unit into operation. Thus, the attachment unit and cooling unit are operated both manually and electronically.

The conduction cooling mechanism of the present invention achieves targeted internal temperature equilibration of food articles within 3 to 5 times shorter duration than those required under conventional refrigeration techniques. The conduction cooling mechanism also readily permits precise targeting of equilibrated temperatures, i.e. solid or liquid articles may be placed in the apparatus for "cooling" (with an equilibration goal of 40 degrees F. ), "chilling" (33 degrees F. equilibration), or "super-chilling" (29 degrees F. equilibration) operations.

With each of the selected temperature ranges, the fluid transfer media, which is circulated through the unit's shelves in order to bring about the preferred temperature equilibration, retains its fluid viscosity at a level suitable for continuous recirculation through the closed-loop or serpentine configuration system.

Additional aspects and features of the present invention will appear from the following description in which the preferred embodiments are set forth in detail in conjunction with the accompanying drawings.

BRIEF DESCRIPTION OF THE DRAWINGS

FIG. 6 is a partial section from elevational view of a cabinet having electrically heated shelves;

FIG. 7 is a top plan view of a shelf having a serpentine electrical heating element;

FIG. 8 is a perspective view of the shelf of FIG. 7 with its insulating material peeled away;

FIG. 9 is a partial section side elevational view of a heating cabinet like that shown in FIG. 2, and showing in greater detail the quick-release connectors for this heating cabinet;

FIG. 10 is a perspective view of a vertically-disposed fluid supply conduit, a parallel fluid return conduit, and the male portion of a quick-connect fitting through which fluid from the fluid supply and return conduits are fed to and removed from the cabinet shelves, respectively;

DETAILED DESCRIPTION OF THE PREFERRED EMBODIMENT

Figure 1:
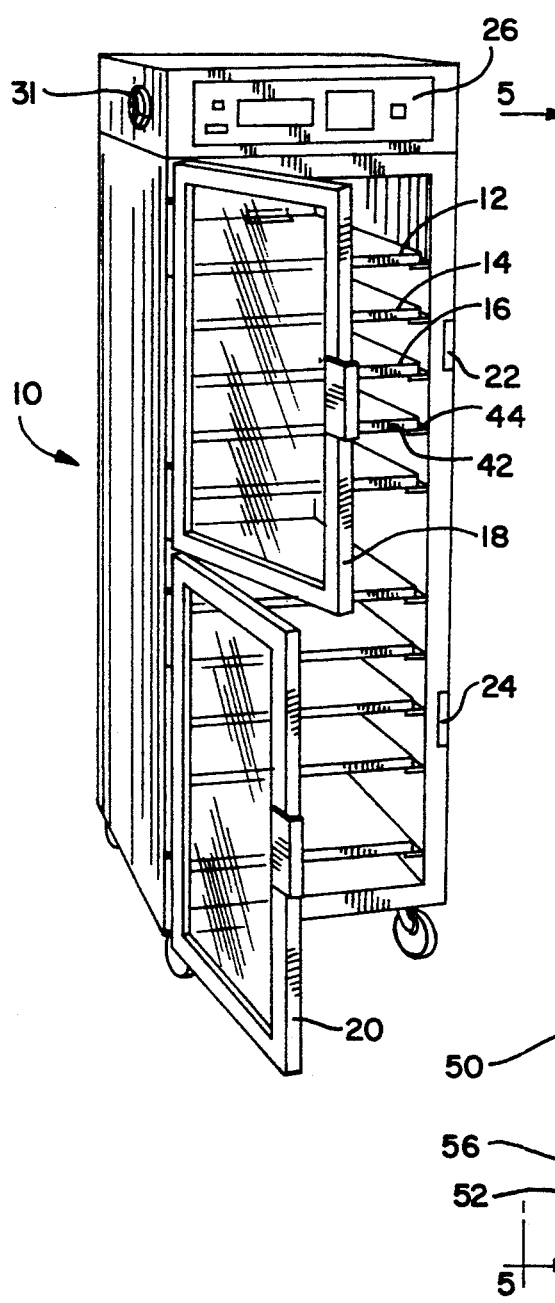
FIG. 1 is a perspective view of one embodiment of the present invention having fluid heated shelves.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspects of the invention to the illustrated embodiments.

Referring now to the drawings, FIGS. 1-5 disclose one embodiment of the present invention comprising a vertical cabinet 10 for transferring heat to food, such as poultry or meat products, and to farinaceous or starch containing products. Typically, these cabinets are made of stainless steel or another lasting, noncorroding and attractive metal. To reduce energy consumption and lower the danger of burns to those who may inadvertently contact its exterior, heat loss through the walls of each cabinet 10 is reduced by insulating those walls.

Figure 2:
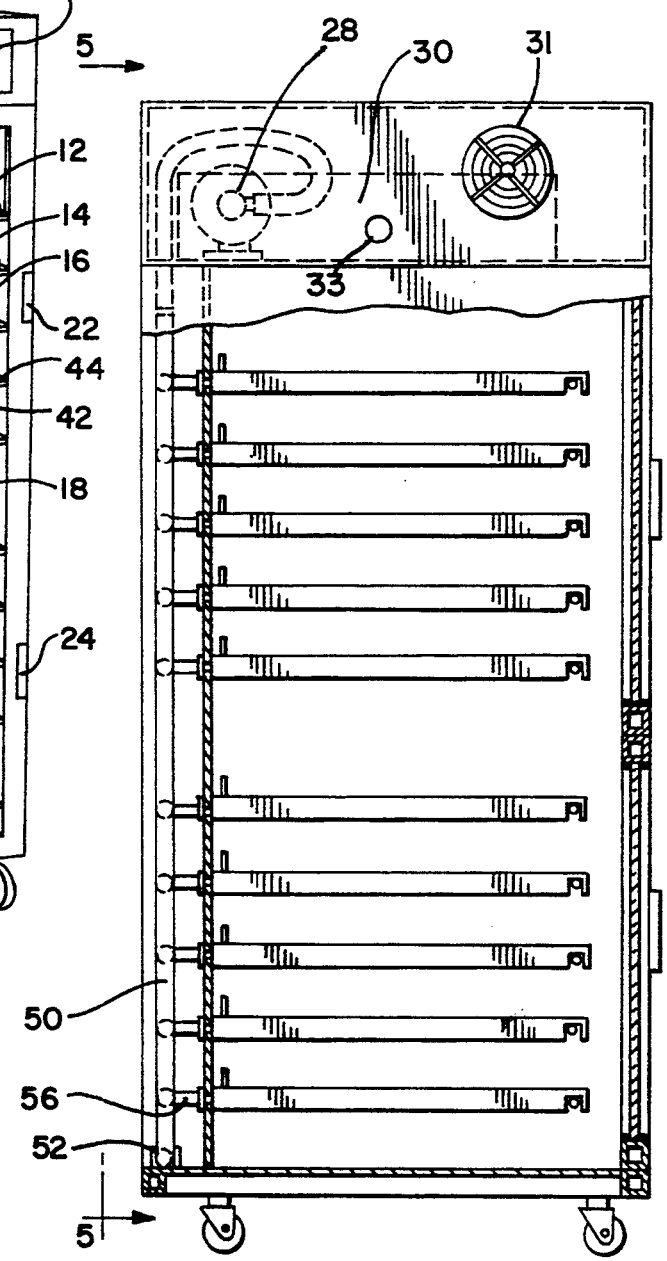
FIG. 2 is a partial section side elevational view of the cabinet of FIG. 1.

A plurality of vertically spaced-apart, rectangularly-shaped support shelves having substantially flat top and bottom surfaces are located in the vertical cabinet 10. Cabinet 10 may typically include ten or more of these support shelves. In FIGS. 1 and 2, the topmost three support shelves within the cabinet 10 are exemplified by reference numerals 12, 14 and 16. Each of the support shelves shown in FIG. 1 is removably secured to the walls of the cabinet 10 and is sufficiently sturdy to support as much as 50 pounds of food articles, such as poultry, fish or meat, within the cabinet 10. The support shelves 12, 14 and 16 are each made of a heat conductive material, preferably aluminum.

A pair of doors 18 and 20 provide access to the shelves 12, 14 and 16. These doors are hinged and are retained in place with magnetic catches 22 and 24, respectively. A control panel 26 at the top of the cabinet 10 enables the operator to control the temperatures of each of the individual shelves in that cabinet 10.

A centrifugal pump 28 is provided at the upper end of the cabinet 10 for circulating a heated fluid through the shelves. The pump used in this embodiment is manufactured by March Manufacturing of Glenview, Ill., Model BC-4K-MD. Adjacent pump 28 is a reservoir 30 which also includes a heating element for initially heating the fluid and for reheating the fluid after its return from the shelves. This reservoir/heating element 30 is available from Watlow. Preferably, as may be seen in FIG. 2, reservoir 30 is coupled to a pressure relief cap 33 (Hydro Craft, Detroit, Mich.). A ventilation fan 31 maintains pump 28 and reservoir 30 at acceptable operating temperatures. The pressure relief cap 33 is necessary to vent any excess pressure from the system. Such excess pressure can occur from the vapor pressure of heated water circulating through the shelves.

Figure 4:
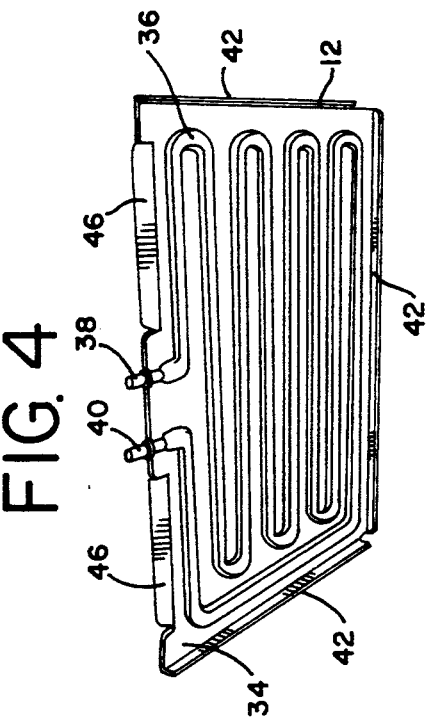
FIG. 4 is a perspective view of a bottom surface of the liquid heated shelf of FIG. 3.
Figure 3:
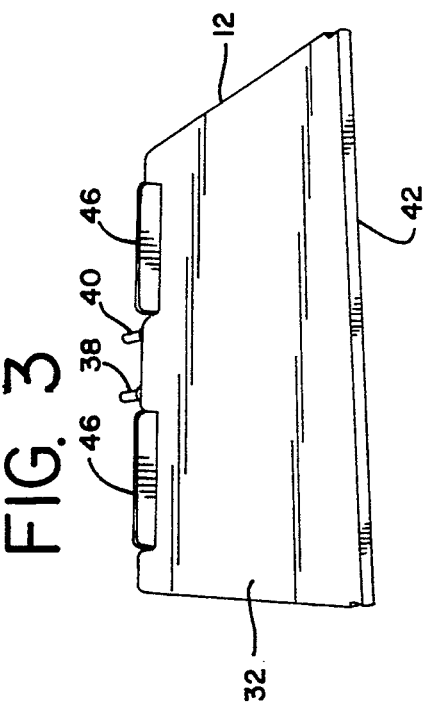
FIG. 3 is a perspective view of a top surface of the shelf disclosed in FIGS. 1 and 2.
Figure 5:
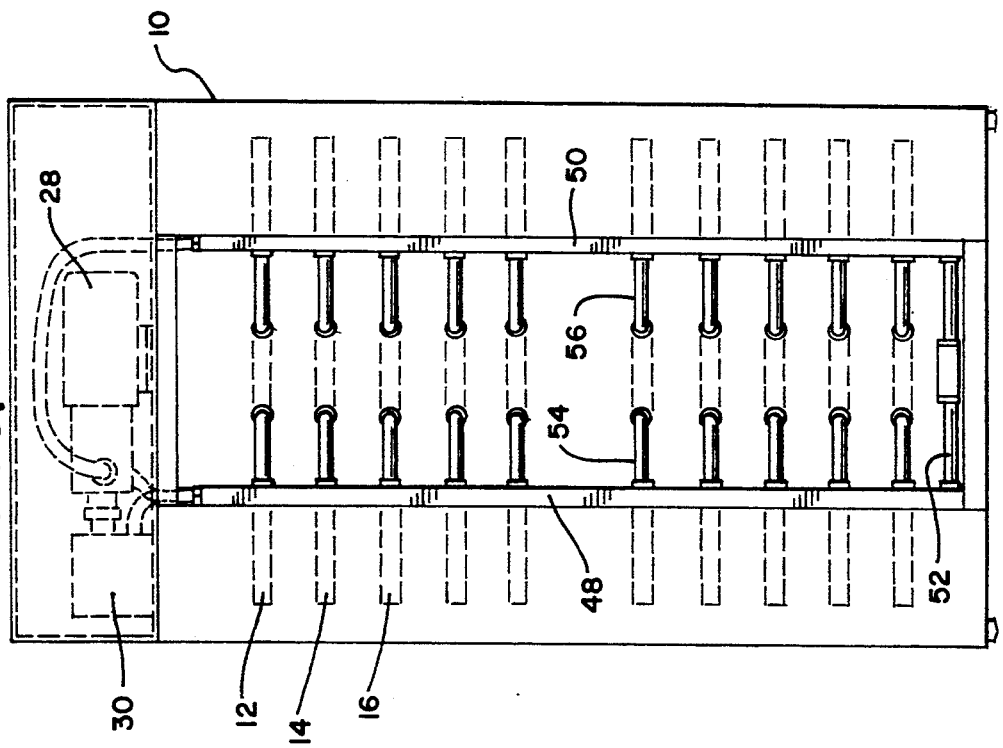
FIG. 5 is a rear elevational view taken along lines 5—5 of FIG. 2.

FIGS. 3 and 4 disclose the structure of the shelves 12 utilized in the heated fluid embodiment of the present invention. Shelf 12 is manufactured from aluminum and is formed by bonding two sheets together by use of a roll-bonding technique. One sheet defines a top surface 32 of shelf 12 and the bottom sheet defines a bottom surface 34 of shelf 12. The sheet used to form top surface 32 is thicker than the sheet used to form bottom surface 34. Preferably, the ratio of top surface sheet thickness to bottom surface sheet thickness should be at least 1.75:1 and, preferably, about 2.25:1. A top/bottom sheet thickness ratio of 2.25:1 dictates a top surface sheet thickness of 90/1000ths inch and a bottom surface sheet thickness of 40/1000ths inch. Such highly disparate thicknesses between top surface sheet thickness relative to bottom surface sheet thickness has been found necessary in order to assure that top surface 32 has an even surface from edge to edge with no high or low spots caused by the roll-bonding process.

As disclosed in FIGS. 3 and 4, shelf 12 becomes thermalized by passage of a heating fluid through a serpentine heating means 36 comprising a serpentine channel which undulates along bottom surface 34. Unlike the aforementioned prior art device, such undulations are generally parallel to the length of rectangular shelf 12. Serpentine channel 36 generally has inner dimensions approximating 1 inch. Heating fluid is passed through serpentine channel 36 through an inlet connector 38 and an outlet connector 40 along a rear side of shelf 12.

Referring again to FIGS. 3 and 4, the shelf 12 has a width and a length. The length of the shelf is the longer of the two dimensions, and is that dimension along which inlet connector 38 and outlet connector 40 are secured. The width of the shelf is the shorter of the two dimensions and is that dimension in FIGS. 3 and 4 to which lead line 12 is directed. As may be appreciated from FIG. 4, the great majority of the serpentine channel 36 is parallel to the length of the shelf 12. In fact, accounting for only straight portions and excluding the 90-degree or 180-degree bends, approximately 90 percent of the serpentine channel 36 is parallel to the length of the shelf 12. As compared to shelves which have much of their channels parallel to their widths, forming a shelf where the great majority of the serpentine channel is parallel to the length of the shelf 12 increases its rigidity. It is believed that significant increases in the rigidity of shelves occurs where 65 percent or more of the straight portions of the channels are parallel to the length of the shelf.

Unlike prior art devices in which inlet and outlet connectors are positioned along a width edge of a rectangular shelf, inlet and outlet connectors 38 and 40 are positioned along the rear length side of shelf 12. This may be seen in FIG. 4. This enables the majority of the serpentine channel to run parallel to the length of the shelf, and increases heating efficiency by causing a higher percentage of top surface 32 to be heated. This also minimizes unheated zones along top surface 32 and assures uniform heating Of all food product placed on top surface 32.

Shelf 12 and serpentine channel 36 are formed by a roll-bonding process. This process is generally known in the aluminum forming art, and includes photographically etching a serpentine pattern on one surface of the bottom sheet. This pattern will define serpentine channel 36. Next, the top and bottom sheets are rolled together under exceedingly high pressure which bonds the top and bottom sheets together, but does not bond portions of the surface of the bottom sheet on which the serpentine pattern is photographically etched. As a result, a serpentine channel is partially formed which can be completed by introduction of high air pressure into channel 36 which causes serpentine channel 36 to inflate into a full three-dimensional shape.

As also disclosed in FIGS. 3 and 4, shelf 12 includes downwardly turned flanged edges along both width sides of shelf 12 and along the length side of shelf 12 opposite from inlet connector 38 and outlet connector 40. As disclosed in FIG. 1, flange edges 42 engage support rails 44 to support the shelves within vertical cabinet 10.

Also disclosed in FIGS. 3 and 4 are a pair of upwardly directed retainers 46 formed along a rear edge of shelf 12. Retainers 46 permit trays of food product to be properly positioned on top surface 32.

Heated fluid is moved from the pump 28 and heating reservoir 30 through a series of conduits along the frame of the cabinet. As best disclosed in FIGS. 2 and 5, a supply conduit 48 within the cabinet 10 feeds the heated fluid to the inlet connector 38 on each shelf. Parallel to supply conduit 48 is a fluid return conduit 50. A bottom portion of conduit 48 is connected to a bottom portion of return conduit 50 by means of linking conduit 52. Linking conduit 52 returns to fluid pump 28 and heating reservoir 30 whatever portion of the heated fluid did not pass through channel 36 of the shelves.

There are substantial advantages in placing the heating reservoir 30 at the top of the cabinet 10. The shelves in cabinet 10 are filled with water during operation. When the operation is ended, the pump 28 is shut down. It was found that water in the shelves from a cabinet with a bottom-mounted reservoir would tend to drain into that reservoir. Consequently, there was an increased tendency for air to enter and become entrapped in those shelves. Placing the reservoir 30 at the top of the cabinet 10 has been the solution to this problem. With the reservoir 30 at the top of cabinet 10, it is impossible upon system shutdown for water from the shelves to drain into the reservoir. Rather, placement of this reservoir 30 at the top of cabinet 10 results in full shelves at all times absent of any air entrapment.

Inlet tubing 54 removably couples the inlet connector 38 to supply conduit 48. Outlet tubing 56 removably couples the outlet connector 40 to return conduit 50. As a result of such coupling, each shelf is independently thermalized.

The preferred heating fluid or fluid transfer media includes a solution of 50 percent water and 50 percent propylene glycol (DOWFROST ® HD, Dow Chemical, USA). It is understood that if the heater 30 portion of the unit is not being used, and if instead the cooling unit and attachment unit are used, the fluid transfer media may function as a cooling fluid, thereby converting cabinet 10 into a conduction refrigeration unit.

FIGS. 6–8 disclose another embodiment of the present invention which utilizes electrical heating rather than fluid heating shelf thermalizing means. As shown in FIG. 6, this embodiment also includes a vertical cabinet 58 and a plurality of vertically spaced-apart, individually heated support shelves, such as shelves 60, 62 and 64, carried within the vertical cabinet for supporting foods. Like the embodiment of FIGS. 1–5, the support shelves of this embodiment are made of a heat conductive material. The heat conductive material in this embodiment is stainless steel.

Thermal energy for shelves 60, 62 and 64 is provided by an electrical power source 66 at the upper end of the cabinet 58. Power source 66 is a conventional alternating current device which can circulate electrical current through conducting elements in the shelves.

As may be seen in FIGS. 7 and 8, a serpentine electrical power conduit 68 is enclosed entirely within shelf 60, and comparable serpentine channels are enclosed in each of the other shelves. As may be seen in FIG. 7, the area of this serpentine power conduit 68 is in excess of one-half of the area of the shelf 60. In addition, because it is entirely enclosed by the shelf construction, serpentine conduit 68 provides for both uniform conductive heating for the top of the shelf and some convective heating for food products carried on below-positioned shelves. The enclosed serpentine conduit 68 also assures uniform heating of at least the upper surface of each shelf, and thereby eliminates unintended temperature gradients along the surface of the shelf.

Preferably, serpentine conduit 68 is a metallic heating conductor. The conductor material may be a resistance heating alloy, such as copper, brass or aluminum. Typically, the material is very thin, on the order of 10 to 100 micrometers.

As disclosed in FIG. 8, an insulating material 70, such as polycarbonate, overlays the serpentine heating conduit 68 to form a heating foil 72. Insulating material 70 peeled away should be quite thin, on the order of 3/32 to ⅛ inch. The insulating material 70 may also be selected from any suitable group of insulators, including polyvinyl chloride, polyester, silicone rubber and micanite.

Heating foil 72 includes at least one current inlet connector 74 and one current outlet connector 76 through which alternating current enters and leaves the conduit 68 of shelf 60. The location of inlet connector 74 and outlet connector 76 can vary and is a matter of design choice largely dependent on the particular configuration of the serpentine heating element. Electrical supply wiring 78 within the cabinet transfers the electrical current from the electrical power source 66, while electrical ground wiring (not shown) within the cabinet returns the electrical current from the serpentine heating conduit 68.

Finally, cabinet 58 includes first electrical junction means for securing the inlet connector 74 to the electrical supply wiring and second electrical junction means for securing the outlet connector 76 to the electrical ground wiring. In this way, conduit 68 can be removably plugged into the electrical supply wiring 78 and the ground wiring.

FIGS. 9–13 show a liquid heated embodiment that provides for quick-connect and quick-disconnect of shelves to the frame of the vertical heat-transferring cabinets. Particularly, FIG. 9 depicts, in a partial section side elevational view, a cabinet-style heat transferring apparatus 80 like that shown an FIG. 2. This FIG. 9, however, shows in greater detail an example of a particular type of quick-release connector, hereinafter occasionally referred to as "quick-release fittings" or "quick-connectors."

The cabinet 80 of FIG. 9, like that of FIG. 2, includes a vertically-disposed fluid supply conduit 82 and a parallel fluid return conduit 84. As with the conduits of the cabinet of FIG. 2, these fluid supply conduits 82 and return conduits 84 supply fluid to the shelves 86. Shown on fluid supply conduit 82 and fluid return conduit 84 are the male portions 88 of quick-connect fittings 90. Fluid from the fluid supply 82 and return 84 conduits are fed to and removed from the cabinet shelves 86, respectively, through the male portions 88 of these quick-connect fittings 90. The fluid supply conduit 82 is connected to the discharge side of pump 92, while the fluid return conduit 84 is connected to the suction side of pump 92.

Figure 11:
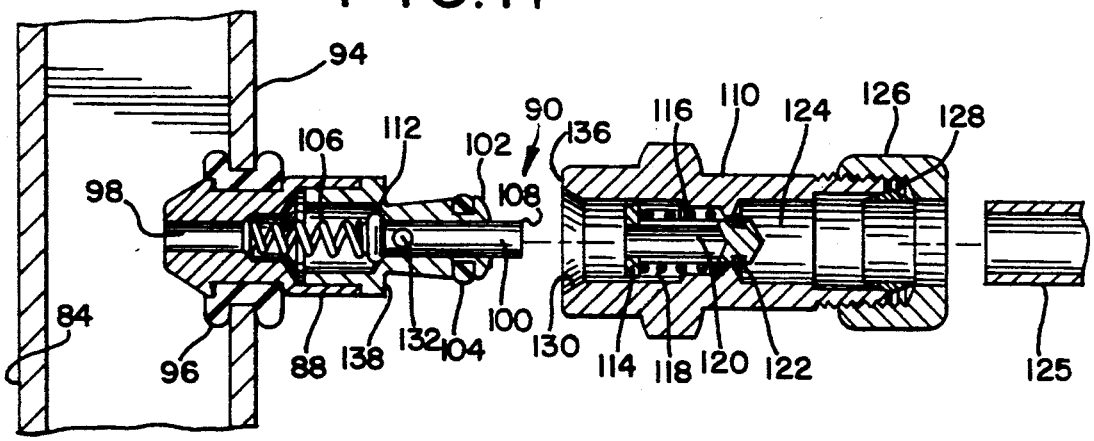
FIG. 11 is an enlarged side section view of the fluid return conduit and the male portion of the quick-connect fitting of FIG. 10, and further showing the female portion of that quick-connect fitting, a threaded end cap with a contained compression fitting, and the end of a shelf, the shelf being in position for securement to the female portion of the quick-connect fitting with the threaded end cap and its contained compression fitting.
Figure 12:
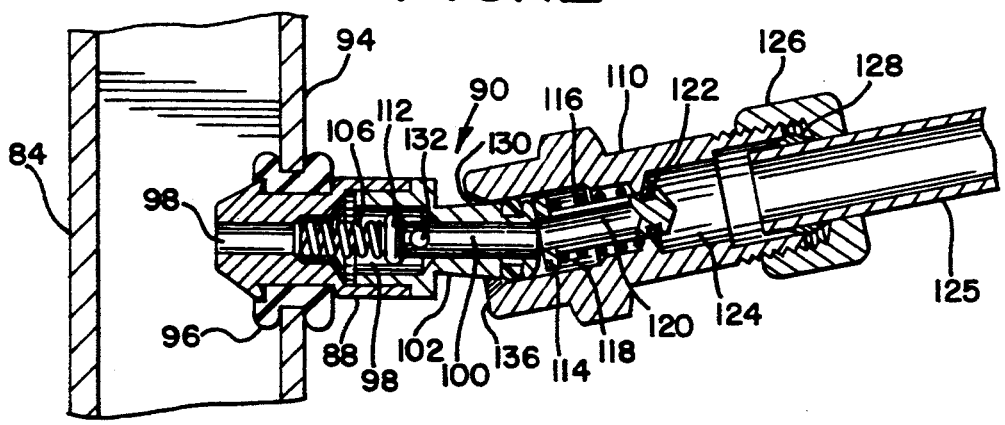
FIG. 12 is a view of the components shown in FIG. 11, but with the end of the shelf secured to the female portion of the quick-connect fitting, and with the female portion of the quick-connect fitting being angled into preliminary contact with the male portion of the quick-connect fitting.
Figure 13:
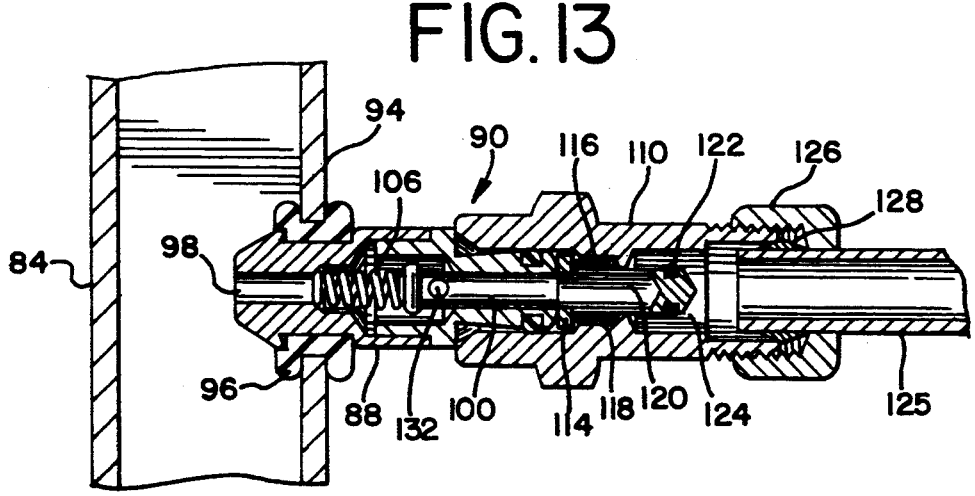
FIG. 13 is a view of the components of FIG. 12, and with the female and male portions of the quick-connect fittings in their fully engaged positions such that both of those portions are opened to permit fluid flow.

The male portion 88 of quick-connect fitting 90, and the quick-connect fitting 90 itself, may be seen and best understood by reference to FIGS. 11–13. In these Figures, a male portion 88 of fitting 90 is shown in its position secured to fluid return conduit 84. The male portion is physically secured to a wall 94 of fluid return conduit 84 with a pliable, rubber-like grommet 96. This grommet 96 also provides a fluid-tight seal of the hole drilled into the fluid return conduit 84 which permits entry of the male portion 88 of fitting 90.

Fitting 90 also includes an inner fluid passage 98 disposed along the central axis of the male portion 88. In the embodiment of FIGS. 11–13, this inner fluid passage 98 has three portions. When viewed from left to right in FIGS. 11–13, these three portions have increasing diameters.

The male portion 88 of fitting 90 also includes a rigid, hollow polymeric tip 100. Each tip 100 is axially disposed in a tip guide 102 segment at the distal end of the male portion 88. Circumscribing this tip guide 102, and housed in a groove along the exterior, is an O-ring 104.

The tip 100 is indirectly secured at one of its ends to a spring 106. As may be seen from FIG. 11, the other end 108 of tip 100 extends outwardly from the male portion 88 of fitting 90, and is visible when the male portion 88 is separated from the female portion 110. In the position of the components shown in FIG. 11, the spring 106 biases a gasket 112 to create a fluid-tight seal between inner fluid passage 98 and the hollow portion of tip 100.

FIG. 12 depicts the female portion 110 of fitting 90 being placed into initial engagement with the male portion 88 of that fitting 90. Female portion 110 of fitting 90 includes a spring-biased, hard polymeric disc 114. Disc 114 is not solid, but rather has openings permitting fluid flow through that disc 114. One end of the spring 116, which biases this disc 114, abuts against the far end of a first fluid chamber 118.

The disc 114 is secured to one end of a pin 120. An O-ring 122 is secured to the other end of this pin 120. In the positions of FIGS. 11 and 12, this O-ring 122 separates first fluid chamber 118 from second fluid chamber 124. As may be seen in FIG. 13, however, upon abutment of disc 114 against the end of tip guide 102, disc 114 is pushed to the right, compressing spring 116 and moving the pin 120 and O-ring 122 to the right. This effectively opens first fluid chamber 118 to second fluid chamber 124, permitting fluid flow through the entire fitting 90. In this way, fluid can pass to or from the fluid return conduit 84, the fitting 90, and the inlet 38 or outlet connectors 125 of the shelves, such as shelf 86.

As may best be seen in FIG. 11, a threaded end cap 126 is secured to one end of the female portion 110 of fitting 90. A compression ring 128 is captured within this threaded end cap 126. When the present invention is fully assembled and in its normal operational mode, and as stated above, the male portion 88 of fitting 90 is secured to the fluid return conduit 84. In addition, the female portion 110 of fitting 90 is normally secured to an inlet 38 (not shown) or outlet connector 125 of shelf 86. This securement is effected, for example, by inserting outlet connector 125 through threaded end cap 126 and compression fitting 128, and then threading that end cap 126 onto the appropriate end of the female portion 110 of fitting 90. In FIG. 12, both portions of fitting 90 are shown in their normal operational mode. In particular, male portion 88 of fitting 90 is secured to fluid return conduit 84. Female portion 110 of fitting 90 is secured to the outlet connector 125 with threaded end cap 126 and its compression fitting 128.

Female portion 110 of fitting 90 includes a flared end 130. As may be seen in FIG. 12, this flared end 130 permits the female portion 110 to be mated with the male portion 88 at an angle from the horizontal. This attribute is important for ease of installation. As will be explained below, the ability to install shelf 86 at an angle from the horizontal also facilitates the operation of means provided for tightly securing together male 88 and female 110 portions of fitting 90.

With the above description of the components shown in FIGS. 9–13 as background, the operation of the quick-connectors can be readily understood. As discussed above, flared end 130 permits an angled engagement of shelf 86, and female portion 110 to which shelf 86 is secured, with male portion 88. This may best be seen in FIG. 12. Spring 106 in male portion 88 is less stiff than spring 116 in female portion 110. As a result, upon the contact of tip 100 with disc 114 as shown in FIG. 12, only spring 106 compresses. As a result, tip 100 withdraws into tip guide 102 and gasket 112 is moved away from its seat. Moreover, orifice 132 in the side wall of tip 100 is moved into the inner fluid passage 98. Fluid within that passage 98 may then pass through orifice 132 into the interior of the hollow tip 100.

As the female portion 110 is pushed into closer engagement with the male portion 88, tip 100 disappears entirely from view within the tip guide 102, and the end of tip guide 102 engages disc 114. Tip guide 102 pushes the disc 114, spring 116 and pin 120 to the right, releasing O-ring 122 from its seat. As a result and as may be seen in FIG. 13, fluid can pass between the first fluid chamber 118 and the second fluid chamber 124.

As discussed above, the present device includes means to ensure that the shelf 86 and fitting 90 remain in the essentially locked position of FIG. 13. These means are shown in FIG. 9, and comprise a plurality of generally horizontal bar-like or dowel-like devices 134. To install shelf 86 into cabinet 80, the shelf 86 is held at an angle to the horizontal. The shelf 86 and its female portion 110 are pushed towards male portion 88 of fitting 90 until a butt end 136 of the female portion 110 engages a butt end 138 of the male portion 88. The shelf 86 is then lowered into the horizontal position shown in FIG. 9. In this horizontal position, the dowel 134 is lodged between or snaps into a slot 136 formed or fabricated along the underside of the shelf. In this way, the shelf 86 is held in the position shown in FIG. 9, notwithstanding the pressure of springs 106 and 116.

When shelf 86 is in the position shown in FIG. 9, the male 88 and female portions 110 of fitting 90 are in the positions shown in FIG. 13. This FIG. 13 depicts the present device in a state where there is an open fluid path from the fluid supply 82 or return conduit 84 through fitting 90 and then through the inlet or outlet 125 connectors of the shelf 86.

Significantly, these quick-connectors 90 also prevent air from entering the system when the shelves 86 are removed from cabinet 80. When the shelves 86 are removed from cabinet 80, the female portion 110 of connector 90 is separated from the male portion 88 of connector 90. This is depicted in FIG. 11. As may be seen from the positions of the components of connector 90 in FIG. 11, the fluid in both return conduit 84 and inner fluid passage 98 is trapped by gasket 112, and cannot move into rigid, hollow polymeric tip 100. In addition, the fluid in shelf 86, outlet connector 125, and second fluid chamber 124 is trapped by O-ring 122, and cannot move into first fluid chamber 118. Thus, a shelf 86 may be removed from the cabinet 80 without loss of fluid from either the shelf 86, or from the conduit 84 and male portion 88, even when the pump 92 is operating or when the shelf and conduits 82 and 84 are filled with water. In this way, the quick-connector 90 also ensures that air will not be drawn into the system when a shelf 86 is removed from cabinet 80.

Figure 14:
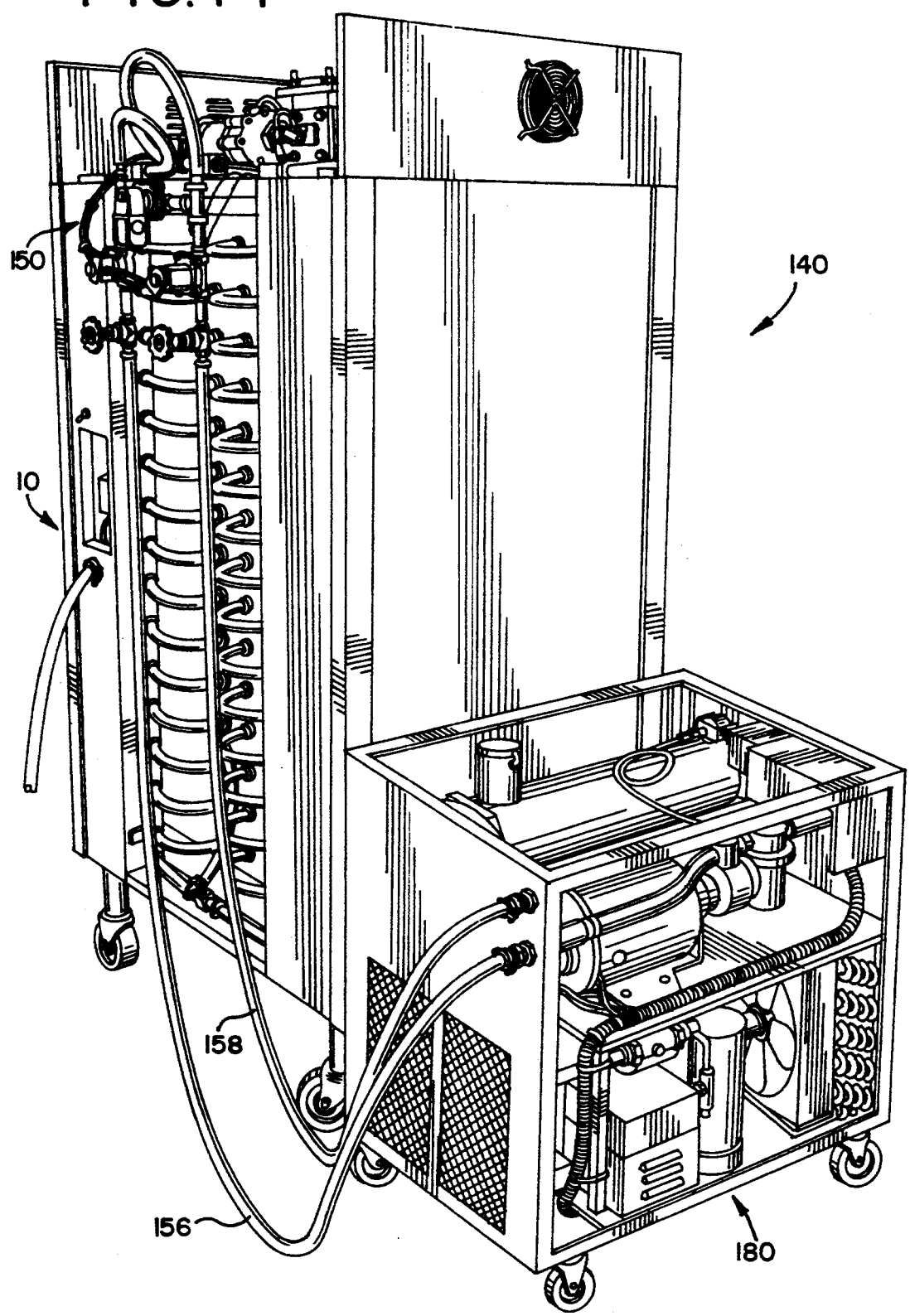
FIG. 14 is a perspective view of the conduction refrigeration/cooling assembly means comprising a heating/cooling selector attachment unit connected to the cabinet of FIG. 1 and a refrigeration/cooling unit connected to the attachment unit via an input pipe and an output pipe.

FIG. 14 shows a perspective view of the conduction refrigeration/cooling assembly means 140 that can be used with the cabinet 10 of FIGS. 1–5. This cooling assembly means 140 provides for the conversion of the cabinet-style apparatus from a heating system and oven unit to a cooling system and refrigeration unit. A heating/cooling selector attachment unit 150 is connected to the back manifold of the vertical cabinet 10 of FIG. 5. A refrigeration/cooling unit 180 is positioned adjacent cabinet 10 and connected to the attachment unit 150 via an output pipe unit 156 and an input pipe unit 158. In order that the functioning of the components and connections at the top of the cabinet-style apparatus are not substantially disrupted, the embodiment encompassing a separate external attachment unit connected to the back of the cabinet and a separate remote cooling unit is used. However, the use of a cooling assembly with the cabinet 10 of the present invention is not limited to the disclosed embodiment. While the embodiment shown uses a separate cooling assembly 140 with the cabinet 10, it is appreciated that the cooling assembly 140 and cabinet 10 can also be incorporated into a single mechanism or machine.

Figure 20:
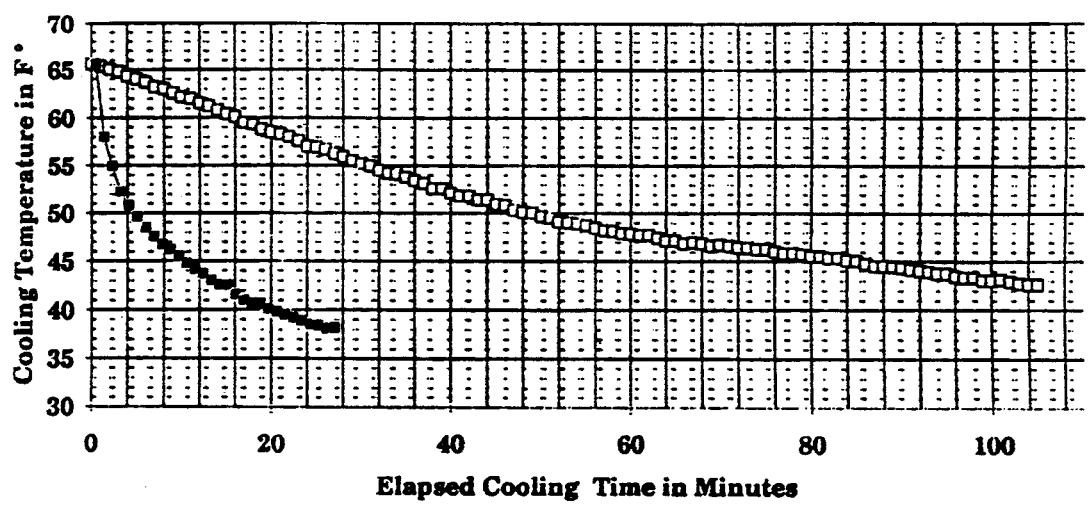

The conduction cooling assembly 140 used in conjunction with the cabinet 10 achieves targeted internal temperature equilibration of food articles, within 3 to 5 times shorter duration than those required under conventional refrigeration techniques using convection cooling which blows cold air directly on the food articles. FIG. 20 illustrates a graph which compares the relation of the cooling time and temperature between items cooled in the apparatus of the present invention using conduction refrigeration and items cooled using conventional convection refrigeration. As can be seen from the results illustrated on the graph, items that are cooled in the apparatus of the present invention are cooled to a certain temperature at a much faster rate using conduction refrigeration than items cooled by conventional convection refrigeration. The conduction cooling assembly 140 also provides for precise targeting of the equilibrated temperatures. The fluid transfer media, which is circulated through shelves 12 of cabinet 10 in order to bring about the preferred temperature equilibration, retains its fluid viscosity at a level suitable for continuous recirculation through the closed loop system as discussed above in conjunction with the heating system. The cooling assembly 140 utilizes conduction refrigeration technology rather than conventional convection refrigeration.

Figure 15:
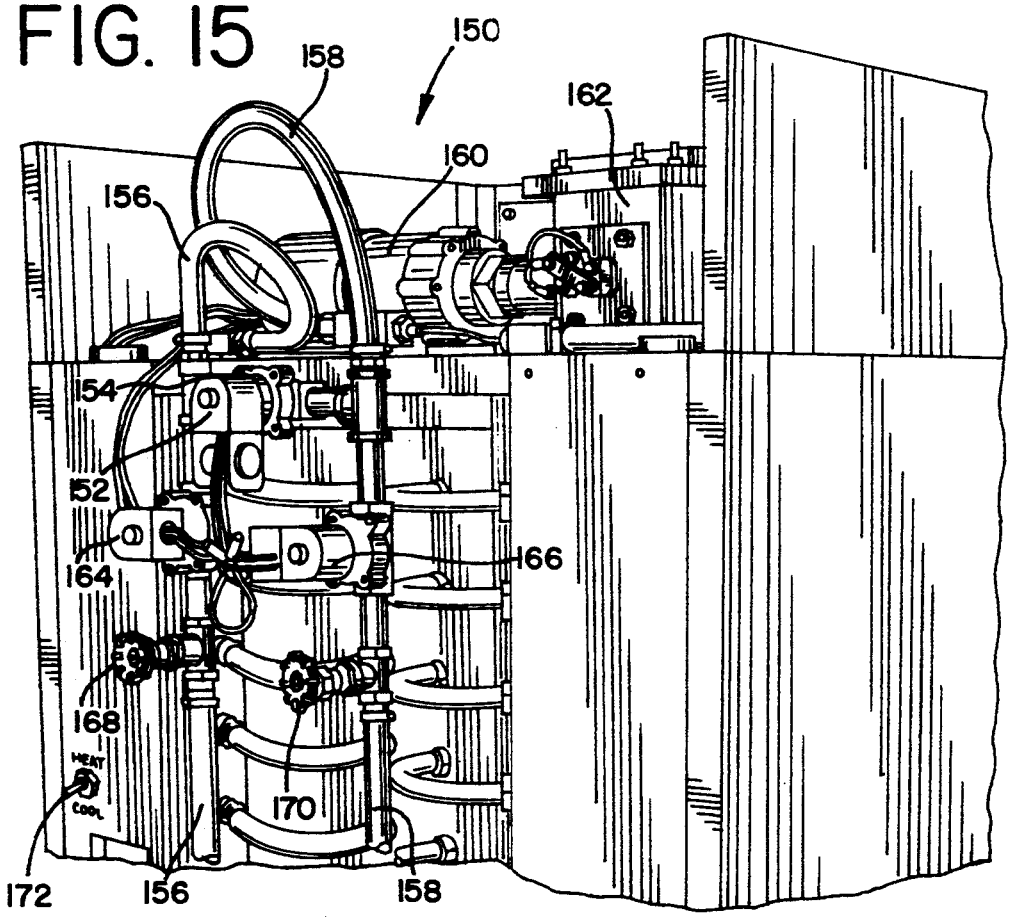
FIG. 15 is a perspective view of the heating/cooling selector attachment unit connected to the back of the cabinet-style apparatus.

FIG. 15 shows the heating/cooling selector attachment unit 150 connected to an upper back portion of cabinet 10. The attachment unit 150 comprises a plurality of valves and pipes that divert the stream of flow of the fluid transfer media either from its cooled state from the cooling unit 180 into the cabinet 10 or from its heated state from the heating element/reservoir 30 (FIG. 2) into the cabinet 10. A first temperature valve 152 is connected to connector pipe sections 154 which are adjacent each side of the first temperature valve 152. One of the connector pipe sections 154 is connected at its end portion to an output pipe unit 156. The other connector pipe section 154 is connected at its end portion to an input pipe unit 158. The first temperature valve 152 is an electrically activated solenoid valve controlled by a control box 244 (see FIG. 16) located in the refrigeration/cooling unit 180. When the cooling mode is activated, the first temperature valve 152 closes, and the chilled fluid transfer media which is transported from the cooling unit 180, is diverted to the inlet connectors of the shelves 12 and into the serpentine channels of shelves 12 of the cabinet 10. When the heating mode is activated, the first temperature valve 152 opens so that the heated fluid transfer media flows from a heating element/reservoir 162 through the connector pipe sections 154, through a series of conduits and inlet connectors along the frame of the cabinet 10, and into the serpentine channels of shelves 12 for heating.

The output pipe unit 156 introduces and transfers chilled fluid transfer media from the remote cooling unit 180 into the attachment unit 150. A cabinet circulating pump 160, like the centrifugal pump shown in FIG. 2, is provided on the top surface of the cabinet 10 and is only used to circulate the fluid transfer media when the apparatus is in the heating mode. The pump 160 used is manufactured by March Manufacturing of Glenview, Ill., Model BC-4K-MD. Adjacent pump 160 is a reservoir/heating element 162 which is also only used when the apparatus is in the heating mode. The heating element 162 heats the fluid transfer media before it flows into the serpentine channels of the shelves 12 and reheats the fluid transfer media after its return from the shelves 12. The reservoir/heating element 162 is like the heating element shown in FIG. 2 and is available from Watlow. The cabinet circulating pump 160 and heating element 162 are not used when the apparatus 10 is in the cooling mode.

Upon activation of the cooling function, the first temperature valve 152 closes and the chilled fluid transfer media that flows from the cooling unit 180 bypasses the connector pipe sections 154 and the first temperature valve 152 and flows into the shelves 12 of cabinet 10 to begin the conduction cooling of the shelves 12. The cooling unit input pipe 158 transfers the fluid transfer media back into the cooling unit 180 after it has circulated through the shelves 12 and apparatus 10 so that it can be re-cooled in the cooling unit 180.

A second temperature valve 164 is located below and at an angle from the first temperature valve 152. The second temperature valve 164 is connected to the output pipe unit 156. A third temperature valve 166 is located directly across from the second temperature valve 164 and below and at an angle from the first temperature valve 152. The third temperature valve 166 is connected to the input pipe unit 158. When the cooling mode is activated, the second temperature valve 164 and the third temperature valve 166 open to divert the flow or circulation of the chilled fluid transfer media from the cooling unit 180 into the shelves 12. When the heating mode is activated, the second temperature valve 164 and the third temperature valve 166 close, as the flow of the heated fluid transfer media is diverted by the first temperature valve 152. Both the second temperature valve 164 and the third temperature valve 166 are electrically activated solenoid valves controlled by the electric components in the control box 244 of the cooling unit 180.

Also included in the attachment unit 150 is a first gate valve 168 and a second gate valve 170 positioned below the second temperature valve 164 and the third temperature valve 166, respectively. The first gate valve 168 is also connected to the output pipe unit 156, and the second gate valve 170 is also connected to the input pipe unit 158. Both gate valves 168, 170 are open when the cooling unit 180 is connected to the cabinet 10 and are closed when the cooling unit 180 is disconnected from the cabinet 10. Thus, the cooling unit 180 can be easily disconnected from the cabinet 10 without disrupting the attachment unit 150 and cabinet 10 components and the heating capability of the cabinet 10.

A temperature selector switch 172 is located on the back panel of cabinet 10. When the switch 172 is in the down position, the cooling mode is activated. When the switch 172 is in the up position, the heating mode is activated.

Figure 16:
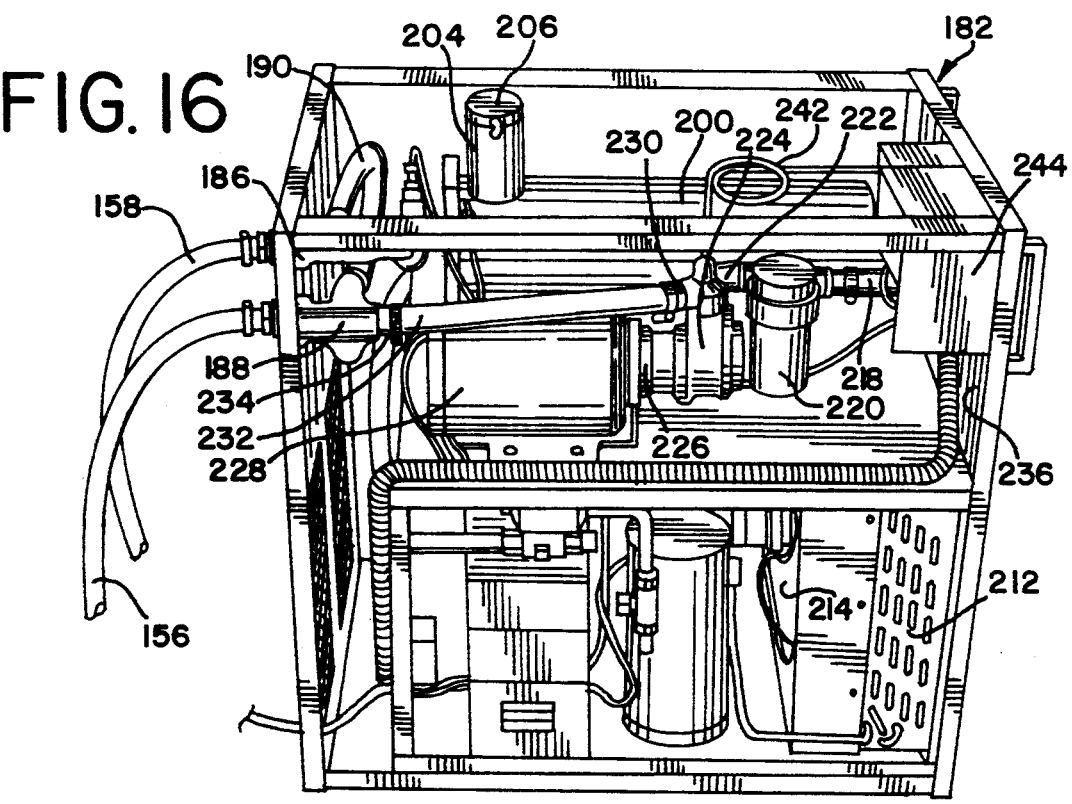
FIG. 16 is a front view of the refrigeration/cooling unit of FIG. 14.
Figure 17:
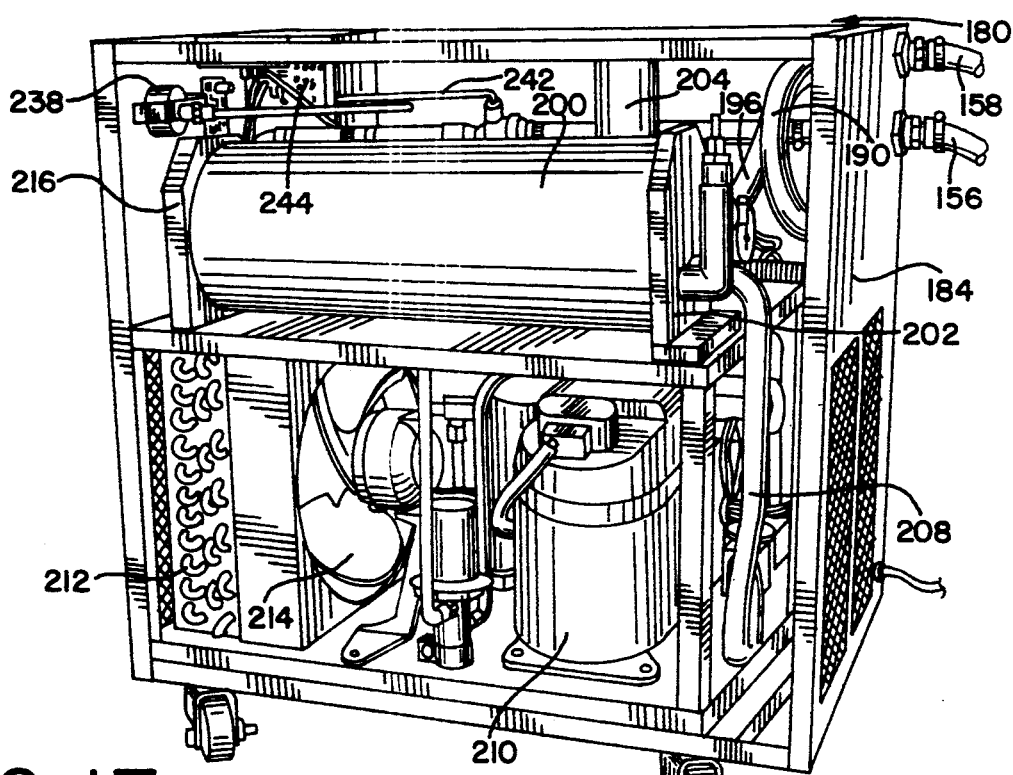
FIG. 17 is a back view of the refrigeration/cooling unit of FIG. 14.
Figure 18:
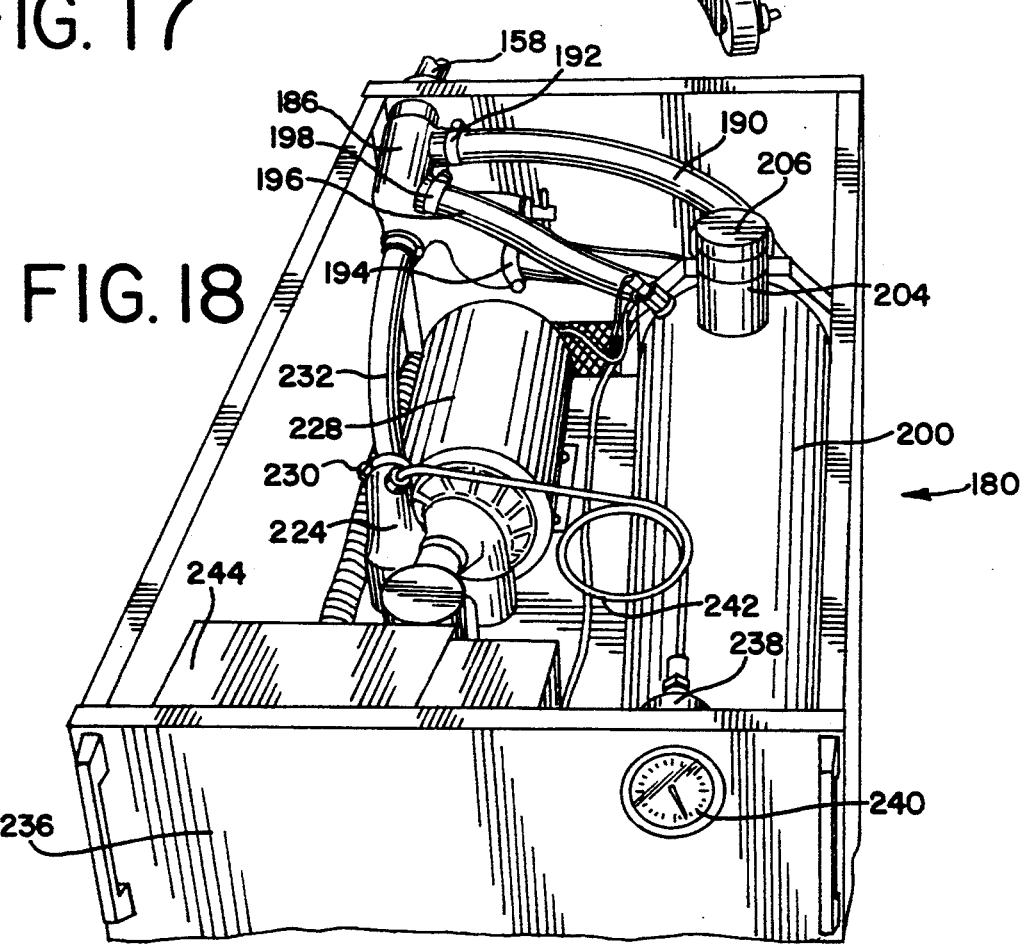
FIG. 18 is a top view of the refrigeration/cooling unit of FIG. 14.

FIGS. 16–18 disclose an embodiment of the cooling unit 180 of FIG. 14. The high-speed conduction chilling apparatus or cooling unit 180 can easily be used with the cabinet-style apparatus 10 shown in FIG. 1 to convert the cabinet 10 from a heating system into a refrigeration system. An embodiment of the cooling unit 180 that can be used comprises a separate remote unit containing the main components of an insulated heat exchanger/evaporator 200, a compressor 210, a fan cooled condenser 212, an inline filter 220, and a cooling unit circulating pump 224 and pump motor 228. These main components, along with other conventional refrigeration technology components, are enclosed in a box-like housing 182. The cooling unit 180 has four swivel wheels and can be moved from one location to another either with or without the cabinet apparatus 10 attached. The preferable cooling capacity used in the cooling unit 180 is sufficient to chill the cabinet 10 to a temperature range of between about 33 degrees F. to about 40 degrees F. with a temperature stability of ±2.0 degrees F. In order to achieve the preferred temperature range, the cooling unit 180 is preferably equipped with a 1 horsepower compressor 210 having 1600 watts of cooling capacity and is equipped with a circulating pump 224 having a circulation rate of 4 gpm (gallons per minute) at 60 PSI (pressure). It is appreciated however, that the dimensions and cooling capacities of the cooling unit 180 may vary depending on such factors as insulation, rate of heat loss, etc., and are not limited to those described in the disclosed embodiment. The cooling unit 180 is highly adaptable to several desired configurations and can accommodate differences in operating components, without compromising the performance of the cooling unit 180 or deviating from the conduction cooling technology.

Specifically, the input pipe unit 158 and output pipe unit 156 are connected to openings in a first side wall 184 of the cooling unit 180 so that they can transport and recirculate the fluid transfer media into and out of the cooling unit 180 and cabinet 10 through the attachment unit 140. As shown in FIG. 18, the input pipe unit 158 is connected to an upper bypass valve 186 located in the interior of housing 182. The output pipe unit 156 is connected to a lower bypass valve 188 also located in the interior of housing 182. The lower bypass valve 188 is adjustable so that the rate of flow of the fluid transfer media can be controlled. A first recirculating connective tube 190 is attached at one end to an upper bypass valve first connector portion 192. The first recirculating connective tube 190 curves downwardly and back around to connect at its other end to a lower bypass valve first connector portion 194. One end of a second recirculating connective tube 196 is attached to an upper bypass valve second connector portion 198 and the other end is attached to an insulated heat exchanger/evaporator 200.

As can be seen in FIG. 16, the insulated heat exchanger 200 has a cylindrical filling structure 202 attached to the top of the heat exchanger 200 and located at the first end 202 of the heat exchanger 200 near the second recirculating connective tube 196. The filling structure 204 has a filler cap 206 which can be removed so that chilling fluid transfer media can be poured into the heat exchanger 200. The preferred chilling fluid includes a solution of 50 percent water and 50 percent propylene glycol (DOWFROST ® HD, Dow Chemical, USA). The heat exchanger/evaporator 200 converts the low pressure fluid transfer media into a low pressure vapor. As the fluid evaporates, latent heat is drawn from within the surroundings of the evaporator, and the temperature in the evaporator 200 decreases. This latent heat must be supplied in order to provide the necessary energy for the conversion of the liquid transfer media to a vapor or gas.

As can be seen in FIG. 17, the heat exchanger/evaporator 200 has an insulated evaporator tube 208 attached to the first end 202 of the evaporator 200 for transporting and circulating the cooled vapor transfer media into a compressor 210. The compressor 210 draws away the vapor, compresses it, and raises the pressure and temperature of the vapor transfer media. A low pressure side of the compressor 210 is connected to the evaporator 200 via the insulated evaporator tube 208, and a high pressure side of the compressor is connected to a condenser 212. The high pressure vapor transfer media from the compressor 210 is relatively hot, and is transferred to the condenser 212 where it is condensed by maintaining the high pressure and reducing the temperature. The temperature reduction is achieved by cooling the condenser 212 with a motorized fan 214 that forces air through the condenser 212. Temperature reduction can also be achieved by a water-cooled condenser. In smaller refrigeration units, the heat may simply be dissipated to the atmosphere by cooling fin means. As a result of the combination of increased pressure and loss of heat, the vapor transfer media condenses back into a liquid and releases the latent heat absorbed in the evaporator 200. The liquid transfer media circulates through other components Of the cooling unit 180 and when it is sufficiently cooled, it is transported from the cooling unit 180 to the cabinet 10 through the attachment unit 150.

As can be seen in FIGS. 17 and 18, at the second end 216 of the heat exchanger/evaporator 200 is attached a third recirculating connective tube 218 which recirculates the transfer media and connects to an upper end of an inline filter 220. The other upper end of the inline filter 220 is connected to a first attachment portion 222 of a cooling unit circulating pump 224. The inline filter 220 acts to filter out any sediments from the fluid transfer media after it returns from the shelves 12 of cabinet 10 for recycling in the cooling unit 180. A second attachment portion 226 of the cooling unit circulating pump 224 connects directly to a cooling unit circulating pump motor 228. The motor 228 provides the energy or work input to the compressor 210. Finally, a third attachment portion 230 of the cooling unit circulating pump 224 connects to one end of a fourth recirculating connective tube 232. The opposite end of the fourth recirculating connective tube 220 is connected to a lower bypass valve second connector portion 234. After the transfer media has circulated through the components of the cooling unit 180 and been transformed from a liquid to a vapor and back to a liquid, the sufficiently chilled fluid transfer media is transported through the lower bypass valve 188 and into the output pipe unit 156 for flow into the shelves 12 of the cabinet 10 through attachment unit 150.

As shown in FIGS. 17 and 18, attached to a second side wall 236 of cooling unit 180 and positioned above the second end 216 of the evaporator 200 is a pressure sensing unit 238 having a pressure gauge 240. The pressure sensing unit 238 is connected to a copper wire 242 which forms a loop at its mid-section and then straightens to connect to the top of the cooling unit circulating pump 224. The pressure generated by the circulating pump 224 is registered on the pressure gauge 240 via the copper wire 242. Located to the side of the pressure sensing unit 238 and also attached directly to the second side wall 236 is a control box 244 which houses various electronic components for operating the cooling unit 180 of the cooling assembly 140.

Figure 19:
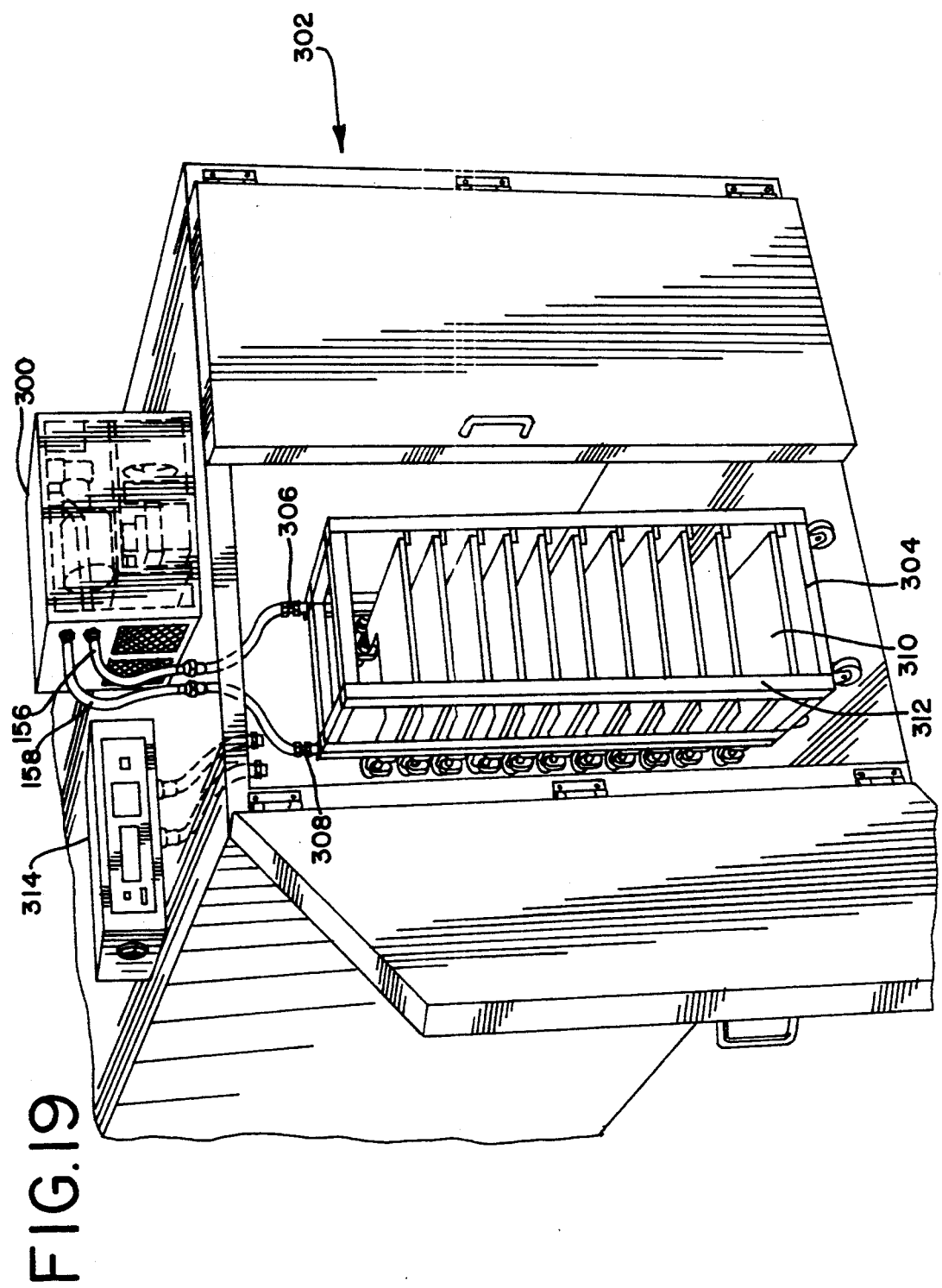
FIG. 19 is a perspective view of an alternate embodiment of the refrigeration/cooling unit of FIG. 16 used with an alternate embodiment of the cabinet-style apparatus of FIG. 1, wherein the apparatus is situated inside of a walk-in refrigerator and attached to the refrigeration/cooling unit which is on the roof of the refrigerator; and, FIG. 20 illustrates a graph comparing the relation of the cooling time and temperature between items cooled in the apparatus of the present invention using conduction refrigeration and items cooled using conventional convection refrigeration.

FIG. 19 is an alternate embodiment of the refrigeration/cooling unit 180 used with an alternate embodiment of the cabinet 10 of the present invention. In this embodiment a refrigeration/cooling unit 300 similar to the cooling unit shown in FIG. 16, but having no wheels, is positioned on the roof of a conventional walk-in refrigerator 302. For example, when food items that need to be refrigerated are delivered by truck to a store or restaurant, it is desirable to wheel a multi-shelf cart directly to the truck, stack the food items on the cart, and wheel the cart into a walk-in refrigerator. Generally, the food items on the cart are cooled by convection refrigeration in a conventional walk-in refrigerator. However, when the cooling unit 300 of the present invention is used in conjunction with the walk-in refrigerator 302 and a cart apparatus 304, the refrigerator 302 is activated by the cooling unit 300 and conduction cooling is achieved. Thus, the food items are cooled at a faster rate with the use of the attached cooling unit 300. The output pipe unit 156 and the input pipe unit 158 of the cooling unit 300 are extended through the roof of the refrigerator 302, and the output pipe unit 156 is connected to a first quick-connector 306 and the input pipe unit 158 is connected to a second quick-connector 308. The quick-connectors 306, 308 are directly connected to the back manifold of the cart apparatus 304, and they are similar to the quick-connectors shown in FIGS. 11-13. In an alternative embodiment, the quick-connectors may be connected to a single large manifold (not shown) having multiple outlets for connection to many carts. The quick-connectors 306, 308 act to generate the flow of chilling fluid to shelves 310. Unlike the cabinet apparatus 10 of FIG. 1, the cart apparatus 304 used in conjunction with the cooling unit 300 disclosed in this embodiment has no side panels, no back panel and no front doors. The cart 304 is equipped with heating/cooling exchange shelves 310, but the shelves 310 are supported only by four corner posts 312 and have no housing around them. The cooling unit 300 is typically used with a large walk-in refrigerator 302 that is capable of holding ten or more carts 304 at a given time. Each cart 304 may be equipped with quick-connectors 306, 308 for connection to the cooling unit 300. In an alternative embodiment, a single large manifold (not shown) having multiple quick-connector outlets may be positioned on the roof of the refrigerator or within the refrigerator for connection to the carts inside the refrigerator. A large heating unit 314 may also be positioned on the roof of the walk-in refrigerator 302 and may be connected to cart 304. Thus, the cart 304 has the capability of heating or cooling food articles depending on whether the heating unit 314 or the cooling unit 300 is connected to the cart. However, the heating unit 314 and cooling unit 300 cannot be connected to the cart or carts simultaneously. Typically, the heating unit 314 of this embodiment is larger in size and capacity than the heating element 30 of FIG. 2. For example, if each cart 304 requires 3 gallons of water to heat it and 20-30 carts are housed within the refrigerator, the heating unit 314 requires a reservoir large enough to hold 60-90 gallons of water.

While the specific embodiments have been illustrated and described, numerous modifications come to mind without markedly departing from the spirit of the invention. The scope of protection is, thus, only intended to be limited by the scope of the accompanying claims, rather than by the description of the preferred embodiment.

What I claim is:

1. A vertical cabinet for transferring heat to food articles within said cabinet, comprising:
   a. a plurality of vertically spaced-apart support shelves located in said vertical cabinet for supporting food articles within said cabinet, said shelves being made from a heat conductive material;
   b. serpentine-shaped means for thermalizing each support shelf, said means being integrally constructed with each shelf, wherein at least 65 percent of the straight portion of said serpentine-shaped means is parallel to the length of said shelf;
   c. a liquid fluid circulation element at the upper end of said cabinet for circulating liquid fluid through said thermalizing means;
   d. inlet and outlet connectors along the length of said shelves for passing said liquid fluid into and out of said thermalizing means;
   e. supply conduits within said cabinet to which said inlet connectors are removably connected for transferring said liquid fluid from said liquid fluid circulation element to said thermalizing means;
   f. return conduits within said cabinet to which said outlet connectors are removably connected to facilitate return of said liquid fluid from said thermalizing means to said liquid fluid circulation element; and,
   g. quick-connector fittings adapted for securing and removing said shelves to and from said cabinet, said quick-connector fittings comprising male portions attached to said supply conduits and said return conduits of said cabinet, said male portions adapted for engagement with female portions attached to said inlet and outlet connectors of said shelves, wherein upon removal of said shelves from said cabinet, said female portions are disengaged from said male portions in such a manner as to prevent loss of said liquid fluid from said shelves and said male portions, and to prevent entrance of air into said supply conduits and return conduits.

2. The vertical cabinet of claim 1 wherein said cabinet has a cooling assembly means connected to said cabinet for converting said liquid fluid circulation element from a thermalizing means to a cooling means, wherein said cooling assembly comprises:
  a. a heating/cooling selector attachment unit connected to the back portion of said cabinet, said attachment unit having a plurality of valves and pipes for diverting the flow of said liquid fluid depending on whether said cabinet is in a heating mode or a cooling mode;
  b. a cooling unit separate and remote from said cabinet and connected to said attachment unit wherein said cooling unit has a heat exchanger/evaporator, compressor, condenser, circulating pump and circulating pump motor for cooling and re-cooling of said liquid fluid;
  c. an input pipe unit connecting said attachment unit and said cabinet to said cooling unit, wherein said input pipe unit transports said liquid fluid from said cabinet through said attachment unit and to said cooling unit for re-cooling; and,
  d. an output pipe unit connecting said cooling unit to said attachment unit and said cabinet, wherein said output pipe unit transports re-cooled liquid fluid from said cooling unit to said attachment unit and said shelves of said cabinet.

3. A vertical cabinet for chilling food articles within said cabinet, comprising:
  a. a plurality of vertically spaced-apart support shelves located in said vertical cabinet for supporting food articles within said cabinet, said shelves being made from a conductive material;
  b. serpentine-shaped cooling means for cooling each of said support shelves, said means being integrally constructed with each of said shelves;
  c. an attachment unit adjacent the back of said cabinet comprised of a plurality of pipes and valves for circulating a cooled fluid transfer media to and from said cooling means within said shelves;
  d. a cooling unit connected to said attachment unit via an input pipe unit and an output pipe unit, wherein said cooling unit cools said fluid transfer media, said input pipe unit transports said cooled fluid transfer media to said attachment unit and said cabinet, and said outlet pipe unit transports said fluid transfer media from said cabinet and said attachment unit back to said cooling unit for re-cooling;
  e. inlet and outlet connectors along the length of said shelves for passing said fluid transfer media into and out of said cooling means;
  f. supply conduits within said cabinet to which said inlet connectors are removably connected for transferring said fluid transfer media from said attachment unit to said cooling means;
  g. return conduits within said cabinet to which said outlet connectors are removably connected to facilitate return of said fluid transfer media from said cooling means to circulate through said attachment means and return to said cooling unit for re-cooling; and,
  h. quick-connector fittings adapted for securing and removing said shelves to and from said cabinet, said quick-connector fittings comprising male portions attached to said supply conduits and said return conduits of said cabinet, said male portions adapted for engagement with female portions attached to said inlet and outlet connectors of said shelves, wherein upon removal of said shelves from said cabinet, said female portions are disengaged from said male portions in such a manner as to prevent loss of said fluid from said shelves and said male portions, and to prevent entrance of air into said supply conduits and return conduits.

4. A vertical cabinet for conduction cooling and heating of food articles within said cabinet, comprising:
  a. a plurality of vertically spaced-apart support shelves located in said vertical cabinet, said shelves being made of a conductive material;
  b. a heating or cooling means located within each of said support shelves for circulating a fluid transfer media that heats or cools said support shelves;
  c. inlet and outlet connectors along the length of said shelves for passing said fluid transfer media into and out of supply and return conduits connected to said heating or cooling means;
  d. an attachment unit adjacent said cabinet that diverts said fluid transfer media to a heating element if said cabinet is in a heating mode or diverts said fluid transfer media to a cooling unit if said cabinet is in a cooling mode;
  e. said cooling unit connected to said cabinet for chilling said fluid transfer media when said cabinet is in said cooling mode;
  f. said heating element connected to said cabinet for heating said fluid transfer media when said cabinet is in said heating model
  g. quick-connector fittings adapted for securing and removing said shelves to and from said cabinet, said quick-connector fittings comprising male portions attached to a manifold of said cabinet, said male portions adapted for engagement with female portions attached to said inlet and outlet connectors of said shelves, wherein upon removal of said shelves from said cabinet, said female portions are disengaged from said male portions in such a manner as to prevent loss of said fluid from said shelves and said male portions, and to prevent entrance of air into said supply conduits and return conduits.

* * * * *

UNITED STATES PATENT AND TRADEMARK OFFICE
CERTIFICATE OF CORRECTION

PATENT NO. : 5,404,935
DATED : April 11, 1995
INVENTOR(S) : Benno E. Liebermann

It is certified that error appears in the above-indentified patent and that said Letters Patent is hereby corrected as shown below:

Column 2, line 58, delete "individually" and insert --individual--.

Column 2, line 64, delete "In" and insert --If--.

Column 6, line 55, delete "Of" and insert --of--.

Column 18, Claim 4, line 24, delete "conductive" and insert --conduction--.

Column 18, Claim 4, line 42, delete "model" and insert --mode;--.

Signed and Sealed this

Twenty-first Day of November, 1995

Attest:

BRUCE LEHMAN

Attesting Officer

Commissioner of Patents and Trademarks